US012099588B2

(12) United States Patent
Dange

(10) Patent No.: US 12,099,588 B2
(45) Date of Patent: Sep. 24, 2024

(54) SYSTEM AND METHOD FOR CONCEALING INFORMATION ASSOCIATED WITH A PHYSICAL MAIL PACKAGE

(71) Applicant: Amod Ashok Dange, Mountain View, CA (US)

(72) Inventor: Amod Ashok Dange, Mountain View, CA (US)

(73) Assignee: Amod Ashok Dange, Mountain View, CA (US)

( * ) Notice: Subject to any disclaimer, the term of this patent is extended or adjusted under 35 U.S.C. 154(b) by 199 days.

(21) Appl. No.: 17/847,758

(22) Filed: Jun. 23, 2022

(65) Prior Publication Data
US 2023/0214523 A1 Jul. 6, 2023

Related U.S. Application Data

(60) Provisional application No. 63/295,812, filed on Dec. 31, 2021.

(51) Int. Cl.
*H04L 9/08* (2006.01)
*G06F 21/10* (2013.01)
(Continued)

(52) U.S. Cl.
CPC .......... *G06F 21/32* (2013.01); *G06F 21/1015* (2023.08); *G06F 21/106* (2023.08);
(Continued)

(58) Field of Classification Search
CPC ... H04L 9/0825; H04L 9/0866; H04L 9/0894; H04L 9/3231; G06F 21/32; G06F 21/602;
(Continued)

(56) References Cited

U.S. PATENT DOCUMENTS

| 6,185,684 B1 | 2/2001 | Pravetz et al. |
| 6,748,366 B1 * | 6/2004 | Hurwitz ............... G06Q 20/367 |
| | | 705/56 |

(Continued)

FOREIGN PATENT DOCUMENTS

| WO | WO-0135348 A1 * | 5/2001 | ......... G06K 9/00597 |
| WO | WO-2015183783 A1 * | 12/2015 | ............. G06F 21/62 |

OTHER PUBLICATIONS

AÃ¯meur, Esma, Gilles Brassard, and Flavien Serge Mani Onana. "Secure anonymous physical delivery." IADIS Int. J. WWW/Internet 4.1 (2006): 55-69. (Year: 2006).*

(Continued)

*Primary Examiner* — Michael Simitoski
(74) *Attorney, Agent, or Firm* — Shumaker, Loop & Kendrick, LLP

(57) ABSTRACT

A system and method for concealing information associated with a physical mail package. A standardized schema defining a set of roles is maintained. A public-private key pair is generated for each role. A dataset corresponding to the package is received, including data elements associated with the roles. Data access locations are assigned to each data element and encrypted using the public keys of the corresponding roles. machine-readable codes are generated for each encrypted access location and printed on the package. User devices associated with the roles can scan the codes and use the private keys to decrypt the access locations and obtain the data elements for their respective roles.

12 Claims, 4 Drawing Sheets

(51) Int. Cl.
  *G06F 21/32* (2013.01)
  *G06F 21/60* (2013.01)
  *G06F 21/62* (2013.01)
  *G06F 21/64* (2013.01)

(52) U.S. Cl.
  CPC ........ *G06F 21/602* (2013.01); *G06F 21/6218* (2013.01); *G06F 21/6245* (2013.01); *G06F 21/6281* (2013.01); *G06F 21/64* (2013.01); *H04L 9/0866* (2013.01)

(58) Field of Classification Search
  CPC ............. G06F 21/6209; G06F 21/6245; G06F 21/6281; G06F 21/64; G06F 16/29; G06F 16/9554; B64U 2101/60; B64U 2101/64; B65G 1/1371; G06Q 10/083; G06Q 10/0833; G06Q 10/08; G06Q 20/383; G06Q 20/0835; G06Q 20/08355; G06Q 20/0836; G07C 2009/0092
  See application file for complete search history.

(56) References Cited

U.S. PATENT DOCUMENTS

| | | | | |
|---|---|---|---|---|
| 8,805,747 | B2* | 8/2014 | Zimberoff | G06Q 50/40 705/330 |
| 8,812,373 | B2* | 8/2014 | Johnson | G06Q 30/0615 705/26.42 |
| 8,995,665 | B1 | 3/2015 | Tsaur et al. | |
| 11,010,655 | B1* | 5/2021 | Kushner | H04L 63/102 |
| 2001/0044785 | A1* | 11/2001 | Stolfo | G06Q 20/383 705/74 |
| 2002/0013739 | A1* | 1/2002 | O'Donnell | G06Q 30/0635 705/26.81 |
| 2003/0208411 | A1* | 11/2003 | Estes | G06Q 30/0601 705/65 |
| 2004/0128524 | A1* | 7/2004 | Ezaki | G06Q 10/08 713/189 |
| 2004/0254893 | A1* | 12/2004 | Tsuei | G06Q 20/12 705/74 |
| 2005/0283608 | A1 | 12/2005 | Halcrow et al. | |
| 2009/0292930 | A1 | 11/2009 | Marano et al. | |
| 2010/0230328 | A1* | 9/2010 | Bonnell | G06Q 50/60 707/E17.014 |
| 2012/0143709 | A1* | 6/2012 | Shakes | G06Q 30/0601 705/26.1 |
| 2014/0117076 | A1* | 5/2014 | Eberlein | G06F 16/9566 235/375 |
| 2016/0099949 | A1 | 4/2016 | Leondires et al. | |
| 2017/0083802 | A1* | 3/2017 | Chen | G06K 19/06037 |
| 2018/0101691 | A1 | 4/2018 | Das et al. | |
| 2019/0005258 | A1 | 1/2019 | Signas | |
| 2019/0318382 | A1* | 10/2019 | Yang | G06Q 20/326 |
| 2021/0034773 | A1 | 2/2021 | Rajput et al. | |
| 2021/0065099 | A1* | 3/2021 | Dixon, Jr. | G06Q 10/083 |
| 2021/0091937 | A1 | 3/2021 | Dange et al. | |
| 2021/0142276 | A1* | 5/2021 | Gupte | G06Q 10/0838 |
| 2021/0142321 | A1* | 5/2021 | Kaczmarek | G06Q 10/08 |
| 2021/0192073 | A1* | 6/2021 | Goodsitt | G06F 21/6245 |
| 2022/0069991 | A1 | 3/2022 | Herder, III et al. | |
| 2022/0108266 | A1* | 4/2022 | Smith | G06Q 10/083 |
| 2023/0059581 | A1* | 2/2023 | Sankaran | H04W 4/40 |
| 2023/0145741 | A1* | 5/2023 | Santosh | G06Q 20/322 705/330 |

OTHER PUBLICATIONS

R. AlTawy, M. ElSheikh, A. M. Youssef and G. Gong, "Lelantos: A Blockchain-Based Anonymous Physical Delivery System," 2017 15th Annual Conference on Privacy, Security and Trust (PST), Calgary, AB, Canada, 2017, pp. 15-1509, doi: 10.1109/PST.2017.00013. (Year: 2017).*
Androulaki, Elli, and Steven Bellovin. "Apod: Anonymous physical object delivery." International Symposium on Privacy Enhancing Technologies Symposium. Berlin, Heidelberg: Springer Berlin Heidelberg, 2009. (Year: 2009).*
Ouyang, Ju, and Xianping Chen. "Personal Information Two-dimensional Code Encryption Technology in the Process of E-commerce Logistics Transportation." SAIEE Africa Research Journal 113.1 (2022): 52-57. (Year: 2022).*
X. Zhang, H. Li, Y. Yang, G. Sun and G. Chen, "LIPPS: Logistics Information Privacy Protection System Based on Encrypted QR Code," 2016 IEEE Trustcom/BigDataSE/ISPA, Tianjin, China, 2016, pp. 996-1000, doi: 10.1109/TrustCom.2016.0167. (Year: 2016).*
Non-Final Office Action for U.S. Appl. No. 17/847,768 mailed Apr. 10, 2024 (7 pages).
Anonymous "Distributed Global People Registry", Technical Disclosure Commons (Jun. 18, 2019) https://www.tdcommons.org/dpubs_series/2286. (Year 2019).
Y. Chung, K. Moon and H. W. Lee, "Biometric Certificate Based Biometric Digital Key Generation with Protection Mechanism", 2007 Frontiers in the Convergence of Bioscience and Information Technologies, Jeju, Korea (South), 2007, pp. 709-714. (Year: 2007).
Suresh, K. Rajarshi Pal, and S.R. Balasundaram. "Two-factor-based RSA key generation from fingerprint biometrics and password for secure communication." Complex & Intelligent Systems 8.4 (2022): 3247-3261. (Year: 2022).
B. Yan and L. You, "A novel public key encryption model based on transformed biometrics," 2017 IEEE Conference on Dependable and Secure Computing, Taipei, Taiwan, 2017, pp. 424-428, doi: 10.1109/DESEC.2017.8073861. (Year: 2017).

* cited by examiner

SYSTEM AND METHOD FOR CONCEALING INFORMATION ASSOCIATED WITH A PHYSICAL MAIL PACKAGE

CROSS-REFERENCE TO RELATED APPLICATIONS AND PRIORITY

The present application claims priority from U.S. Provisional Application No. 63/295,812 filed on Dec. 31, 2021, entitled "SYSTEM AND METHOD OF AUTHENTICATING A DEPICTION OF A PERSON ONLINE."

TECHNICAL FIELD

The present subject matter described herein, in general, relates to a physical mail package. More specifically, the present subject matter discloses a system and method for concealing information associated with the physical mail package.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Starting with the earliest historical references to the postal system in Egypt around 2000 BC, all the way to the modern-day United States Postal Services agency entrusted with delivering mail-in ballots to American voters, physical mail delivery has been the connective tissue of human communication. While this method of delivery of information and goods still continues, these methods suffer from many flaws.

One major limitation is that physical mail packages are not properly integrated with electronic networks. Additionally, while package carriers do track packages in transit, in the vast majority of instances there is no record on whether the recipient has received the physical mail package. In order to obtain a package delivery acknowledgement, the physical presence of both the delivery person and the recipient at the time and place of delivery is mandated.

In addition to the above, the existing mail systems have had numerous constraints, such as:
- The names and addresses of senders and receivers of the physical mail package are vulnerable to exposure to unrelated parties.
- There is no mechanism to prevent mail items from being delivered to the incorrect address.
- Mail items may be inadvertently opened by the wrong recipient and there is no recourse.
- Mail items may get stolen and the sender and recipient have no knowledge of it.
- The sender does not always get a receipt from the recipient.
- It is easy to send unsolicited advertising mail to anyone.
- Sending and receiving information in respect of physical mail items cannot be programmatically integrated into electronic information systems.

Thus, there is a long-felt need for a system and method for concealing information associated with a physical mail package and tracking physical mail packages.

SUMMARY

This summary is provided to introduce concepts related to a system and a method for concealing information associated with a physical mail package, and the concepts are further described below in the detailed description. This summary is not intended to identify essential features of the claimed subject matter nor is it intended for use in determining or limiting the scope of the claimed subject matter.

In one implementation, a system for concealing information associated with a physical mail package is described. The system comprises a memory and a processor coupled to the memory. The processor is configured to execute programmed instructions stored in the memory for maintaining a standardized schema. The standardized schema defines a set of roles. Further, a public-private key pair corresponding to each role from the set of roles is generated by the processor. Further, the processor is configured for receiving a dataset, corresponding to a physical mail package, from a client application. The dataset may comprise information corresponding to a set of data elements. The at least one data element, from the set of data elements, may correspond to a role from the set of roles. Further, the processor is configured for assigning a data access location to each data element from the set of data elements. Further, the processor is configured for generating an encrypted data access location by processing each data element corresponding to each role from the set of roles based on a public key corresponding to each role from the set of roles respectively. Further, the processor is configured for generating a set of machine-scannable codes corresponding to each of the encrypted data access locations. Further, the processor is configured for printing the set of machine-scannable codes over the physical mail package. Furthermore, a user device corresponding to a target role is enabled with the private-key from the public-private key pair associated with the target role, and wherein the user device is configured to scan a target machine-scannable code corresponding to the target role and decrypt the encrypted target data access location to obtain the at least one data element corresponding to the target role.

In another implementation, a method for concealing information associated with a physical mail package is described herein. The method comprises steps for maintaining a standardized schema. The standardized schema defines a set of roles. The method comprises steps for generating a public-private key pair corresponding to each role from the set of roles. The method further comprises steps for receiving a dataset, corresponding to a physical mail package, from a client application. The dataset comprises information corresponding to a set of data elements, wherein at least one data element, from the set of data elements, corresponds to a role from the set of roles. The method further comprises steps for assigning a data access location to each data element from the set of data elements. The method further comprises steps for generating an encrypted data access location by processing each data element corresponding to each role from the set of roles based on a public key corresponding to each role from the set of roles respectively. The method further comprises steps for generating a set of machine-scannable codes corresponding to each of the encrypted data access locations. The method further comprises steps for printing the set of machine-scannable codes over the physical mail package. Furthermore, a user device corresponding to a target role is enabled with the private-key from the public-private key pair associated with the target role, and wherein the user device is configured to scan a target machine-scannable code corresponding to the target role and decrypt the encrypted target data access location to obtain the at least one data element corresponding to the target role.

BRIEF DESCRIPTION OF DRAWINGS

The detailed description is described with reference to the accompanying Figures. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
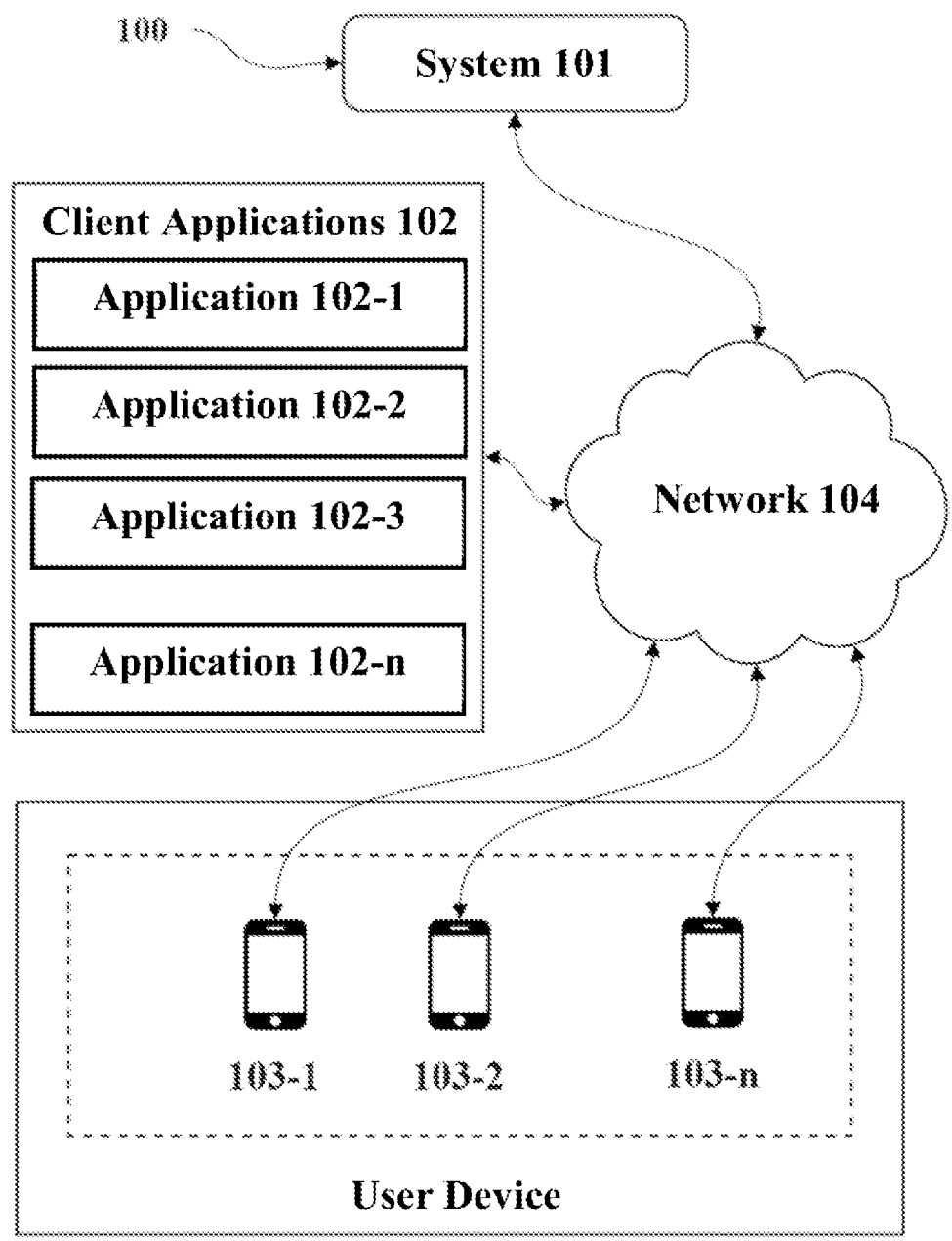
FIG. 1 illustrates a network implementation 100 of a system 101 for concealing information associated with a physical mail package, in accordance with an embodiment of the present disclosure.

Referring to FIG. 1, implementation 100 of a system 101 for concealing information associated with a physical mail package is illustrated, in accordance with an embodiment of the present subject matter. In one embodiment, the system 101 may comprise a processor and a memory. Further, the system 101 may be connected to user devices and applications through a network 104. It may be understood that the system 101 may be communicatively coupled with multiple users through one or more user devices 103-1, 103-2, 103-3 . . . , 103-n and applications 102-1, 102-2, 102-3 . . . , 102-n collectively referred to as a user device 103 and client applications 102 respectively. The client applications 102 may correspond to any mail package delivery services provider such as but not limited to postal service providers, food delivery service providers, medicine delivery service providers, legal process servers, and other product delivery service providers. A distinct set of stakeholders may be associated with each of the client application 102. The set of stakeholders may be divided into groups including package senders, package collection personnel, package sorting personnel, package distribution personnel, package delivery personnel, and package receivers. It must also be noted that each person in each group of the stakeholders may be assigned a unique identity and a distinct role. Since the role of each person in each group of the stakeholders may be different, a distinct public-private key pair may be assigned to each stakeholder in each group. It must be noted that the stakeholder may or may not be a person. For example, in one embodiment, the package delivery personnel may be an automated drone delivery robot, the package sorting personnel may be an image processing-based package sorting machine, the package receiver may be a smart letter box, and the like.

In one embodiment, the user device 103 may be a software or a hardware or any combination thereof assigned to a user/stakeholder in the package delivery ecosystem. Further, the system 101 may enable generating and printing a set of machine-scannable codes on each package. The process of generating and printing the set of machine-scannable codes is elaborated with reference to FIG. 2.

In one embodiment, the set of machine-scannable codes are configured to store encrypted information corresponding to each stakeholder. In order to decrypt the information corresponding to each stakeholder from the set of machine-scannable codes, the user device 103 of each stakeholder may be configured to scan the one or more machine-scannable codes, from a set of machine-scannable codes, printed on the package. The user device 103 may be configured to decrypt the machine-scannable codes and determine whether the user scanning the one or more machine-scannable codes is authorized or not authorized to receive the package. The process for generating the set of machine-scannable codes and decrypting the one or more machine-scannable codes using the user device 103 is further illustrated with reference to FIG. 2 to 6.

In one embodiment, the user device 103 and the system 101 may be coupled together through the network 104. The network 104 may be a communication network used by user devices 103 such as a software application. In one embodiment, the communication network may be but not limited to the Internet.

In one embodiment, the user device 103 may be any electronic device, communication device, image capturing device, machine, software, automated computer program, a robot or a combination thereof. The user devices 103 may support communication over one or more types of networks in accordance with the described embodiments. For example, some user devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. The user devices 103 and network 104 may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others.

As described above, the user device 103 may be a software or a hardware or any combination thereof assigned to a user/stakeholder in the package delivery ecosystem enabled by the system 101. Further the client applications 102 may correspond to any mail package delivery services provider such as but not limited to postal service providers, food delivery service providers, medicine delivery service providers, legal process servers, and other product delivery service providers enabled by the system 101. The system 101 may be configured to register users as well as client applications 102 over the system 101. Initially, the system 101 may enable registration of a client application 102 (for example a courier service provider). The client application 102 may define a set of stake-holders associated with the client application 102. The set of stakeholders may also be registered over the system 101 and linked to the client application 102. As stated earlier, each stakeholder may perform a specific role in the product/package delivery ecosystem enabled by the system 101. After the registration of the stakeholders, a public-private key pair may be assigned to each stakeholder from the set of stakeholders. In a similar manner, multiple package service providers and associated client applications 102 may be registered with the system 102.

Further, the system 101 may be configured to authenticate the user (stakeholder), each time the user makes a request to access the system 101. Furthermore, the system 101 may enable the user to access the client application 102 without having the user reveal their identity. Furthermore, the client application 102 may allow role-based access to information printed on the physical mail package using the user device 103.

In one embodiment, the user devices 103 may be enabled with biometric scanning capabilities. Furthermore, the user devices 103 may also be enabled to maintain a Distributed Global People Registry. The Distributed Global People Registry may be an autonomous free public utility that stores the public-key of every registered stakeholder of each client application 102.

In one embodiment, the client application 102 may be any internet-based application which requires user authentication before providing the user with access to the client application 102. The client application 102 is configured to provide role-based information access to stakeholders of the client application 102. The client application 102 may also manage the public-private key pair associated with each stakeholder and change their role-based access to the encrypted data access locations. The client application 102 may also be enabled to manage the machine-scannable codes to be printed on the physical mail package. The system 101 for concealing information associated with a physical mail package is further illustrated with the block diagram in FIG. 2.

Figure 2:
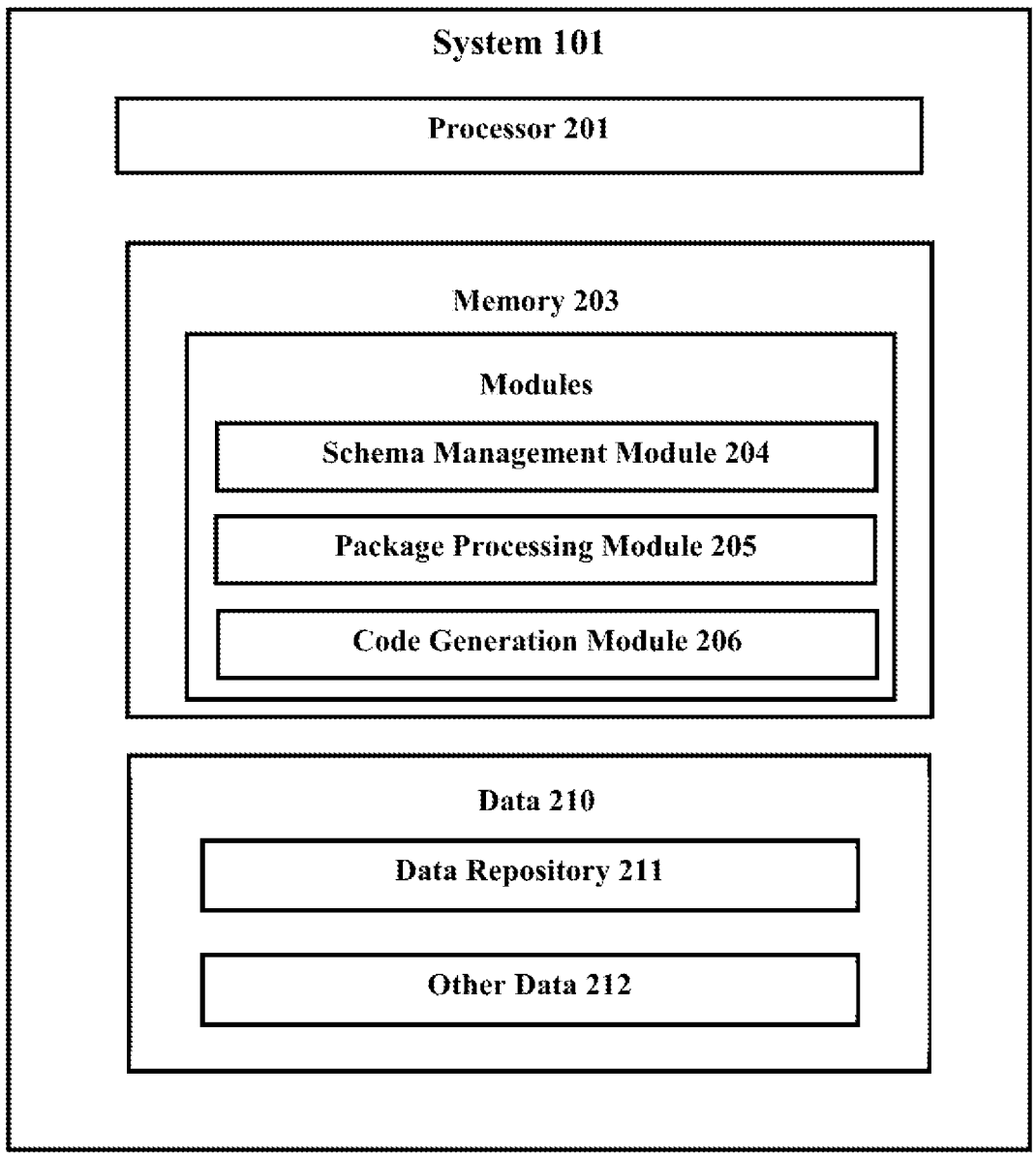
FIG. 2 illustrates components of the system 101 for concealing information associated with a physical mail package, in accordance with an embodiment of the present disclosure.

Referring now to FIG. 2, various components of the system 101 are illustrated, in accordance with an embodiment of the present subject matter. As shown, the system 101 may include at least one processor 201 and a memory 203. The memory 203 consists of a set of modules. The set of modules may include a schema management module 204, a package processing module 205, and a code generation module 206. In one embodiment, the at least one processor 201 is configured to fetch and execute computer-readable instructions, stored in the memory 203, corresponding to each module.

In one embodiment, the memory 203 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and memory cards. The memory 203 may be configured to store the programmed instructions to be executed by the processor 201.

In one embodiment, the programmed instructions may include routines, programs, objects, components, data structures, etc., which perform particular tasks, functions, or implement particular abstract data types. The data 210 may comprise a data repository 211, and other data 212. The other data 212 amongst other things, serves as a repository for storing data processed, received, and generated by one or more components and programmed instructions.

In one embodiment, the processor 201 may be configured for executing programmed instructions corresponding to schema management module 204. The schema management module 204 may be configured to maintain a standardized schema corresponding to each of the client applications 102. In one example, the client applications 102 may be associated with government postal services, courier services, or any package delivery service providers. In such package delivery services, there is a high probability of compromising personal information such as name and address of the package sender and receiver. In order to avoid such information exposure, the schema management module 204 is enabled to define the standardized schema. The standardized schema corresponds to a set of roles. The set of roles may correspond to at least a sender role, a carrier role, and a receiver role. The set of roles are defined to provide role-based access to information such as sender/receiver name, address, contact number, and the like.

Further, once the standardized schema is defined, in the next step, the package processing module 205 is configured to generate a public-private key pair corresponding to each role from the set of roles. In one embodiment, each user/stakeholder in a physical mail packet delivery journey is assigned a distinct role. The package processing module 205 is further configured to select the public key from the public-private key pair. Further, the private-key is stored on the user device 103 of a user/stakeholder who is assigned the role from the set of roles. The public-private key pair is generated during the user registration process.

Further, the package processing module 205 is configured to receive a dataset, corresponding to the physical mail package, from a client application 102. The dataset comprises information corresponding to a set of data elements. It must be noted that each data element, from the set of data elements, corresponds to a role from the set of roles. For example, a data element may correspond to the city/street/house number to which the physical mail package is to be delivered. Another data element may correspond to the content of the physical mail package. Yet another data element may correspond to the city/street/house number from where the physical mail package originated. The name of the sender and receiver of the physical mail package may also correspond to a data element from the set of data elements.

It must be noted that only the authorized stakeholder is able to decrypt the machine-readable code printed on the physical mail package to access the data element corresponding to the stakeholder. For this purpose, once the set of data elements are received, in the next step, the package processing module 205 is configured for assigning a data access location to each data element from the set of data elements. The data access location may be a Uniform Resource Locator (URL) Link. The URL Link may be configured to maintain at least one of the data elements corresponding to at least one of a sender, a receiver, and a carrier of the physical mail package. In a similar manner, multiple URL links are generated corresponding to each role associated with a different stakeholder.

Further, the package processing module 205 is configured to generate an encrypted data access location in the form of an encrypted URL link. The encrypted URL link is generated by processing each data access location corresponding to each role, from the set of roles, based on a public key corresponding to each role from the set of roles respectively.

For example, for the purpose of generating an encrypted URL link corresponding to the sender's geographical location, the package processing module 205 is configured to select the sender's geographical location from the dataset in respect of the physical mail packet. The user (sender of the package) may use the user device 103 in order to transmit the details of the dataset to the system 101.

Further, upon receipt of the dataset, the package processing module 205 at the system 101 is configured to determine the geo-coordinates of the sender's geographical location. The package processing module 205 is configured to generate a first URL pointing to the geo-coordinates of the sender's address, wherein the first URL is associated with the sender role. The package processing module 205 is further configured to select the receiver's geographical location from the dataset in respect of the mail packet and determine the geo-coordinates of the receiver's geographical location. Further, the package processing module 205 is configured to generate a second URL pointing to the geo-coordinates of the receiver's geographical location, wherein the second URL is associated with the receiver role. Further, the encrypted data access location corresponding to the sender's geographical location is encrypted using the public key of the package collection personnel such that only a person with an authorized role such as package collection personnel or collection robot can decrypt the encrypted data access location corresponding to the sender's geographical location. Further, the encrypted data access location corresponding to the receiver's geographical location is encrypted using the public key of the package delivery personnel or delivery robot such that only the package delivery personnel or delivery robot can decrypt the encrypted data access location corresponding to the receiver's geographical location.

Once the URLs are generated, the code generation module 206 is configured to generate a set of machine-scannable codes corresponding to each of the encrypted data access locations. The set of machine-scannable codes are generated by hashing the first URL pointing to the data element in respect of the mail packet and generating a QR code representing the hash. In another embodiment, the set of machine-scannable codes represent URLs in the form of encrypted data access locations.

Further, the code generation module 206 is configured to print the set of machine-scannable codes over the physical mail package. Furthermore, once the set of machine-scannable codes is printed, the user device 103 is configured to scan a target machine-scannable code corresponding to the target role and decrypt the encrypted target data access location to obtain at least one data element corresponding to the target role.

It must be noted that before generating and printing the machine-scannable codes, the user and the user's corresponding role must be registered with the system 101.

In one embodiment, any known technique may be used for registering the user and the user's role to the system 101. The public-private key pair is also generated during the registration process. The public-private key pair may be generated using existing cryptographic techniques. In one embodiment, the private key may be stored at the user device 103 and used for decrypting the machine-scannable codes. It must be noted that instead of storing the private key at the user device 103, the private key may also be reproduced dynamically using the user's biometrics after scanning of the target machine-scannable code. This dynamically generated private key may be used for decrypting the encrypted target data access location.

After registering the user and printing the set of machine-scannable codes over the physical mail package, the user device 103 may be used to scan the target machine-scannable code corresponding to the target role associated with the user of the user device 103. Upon scanning the target machine-scannable code, the user device 103 may use the dynamically generated private key to decrypt the encrypted target data access location and obtain at least one data element corresponding to the target role. The at least one data element may be geo-coordinates of a designated mailbox of the recipient.

It must be noted that if the user accidentally scans a different machine-scannable code than the target machine-scannable code printed on the physical mail package, the different machine-scannable code is not decrypted and an error message may be displayed on the user device 103. Thus, the encrypted data access location is not decrypted and the user is unable to access the encrypted data access location corresponding to the different machine-scannable code. The method for concealing information associated with a physical mail package is further elaborated in the flowchart of FIG. 3.

Figure 3:
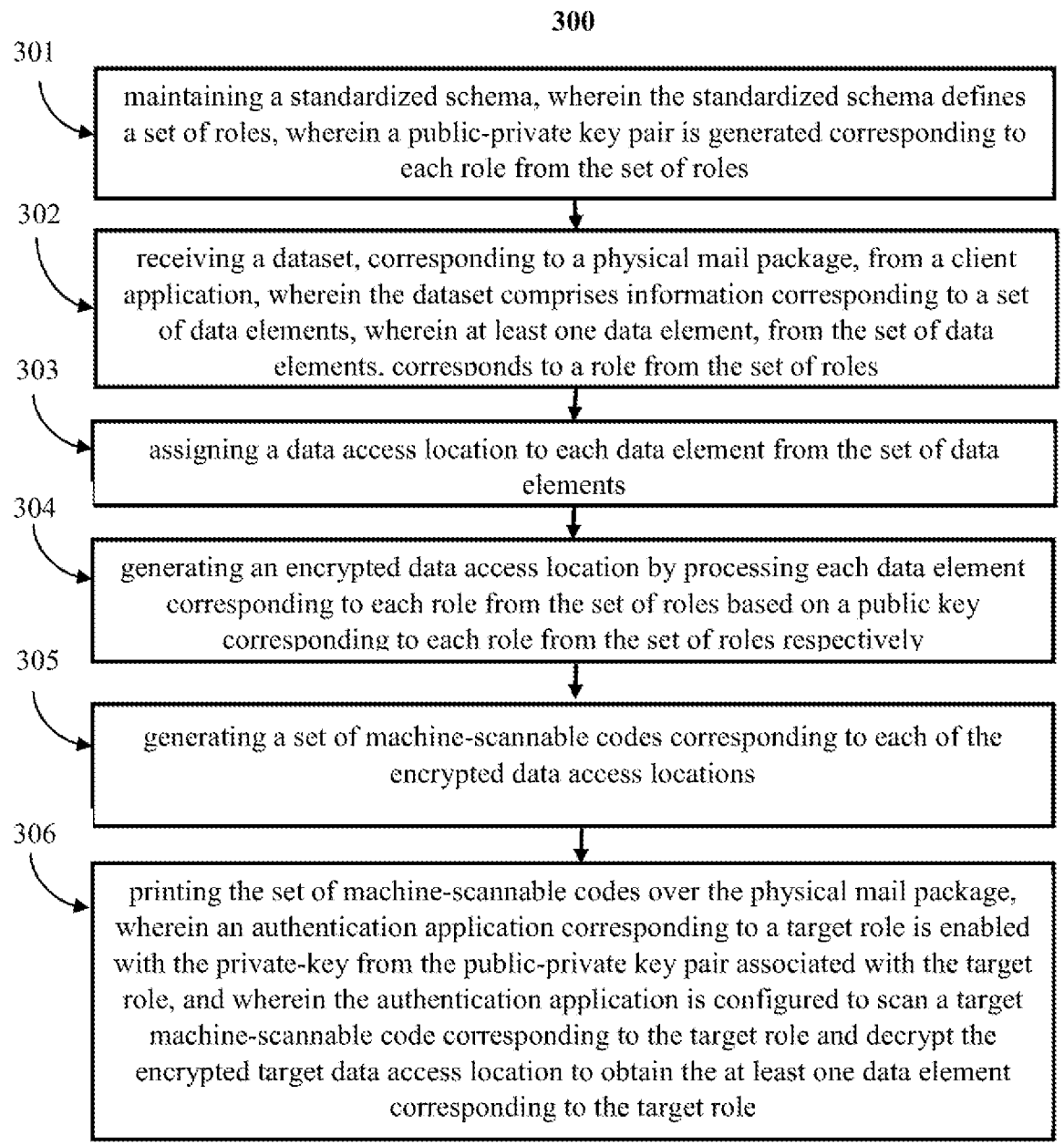
FIG. 3 illustrates a method 300 for concealing information associated with a physical mail package, in accordance with an embodiment of the present disclosure.

Now referring to FIG. 3, a method 300 for concealing information associated with a physical mail package is illustrated, in accordance with an embodiment of the present subject matter.

At step 301, the processor 201 may be configured to maintain a standardized schema. The standardized schema may define a set of roles. Furthermore, a public-private key pair is generated corresponding to each role from the set of roles.

At step 302, the processor 201 may be configured to receive a dataset, corresponding to a physical mail package, from a client application. The dataset may comprise information corresponding to a set of data elements. The at least one data element, from the set of data elements, may correspond to a role from the set of roles.

At step 303, the processor 201 may be configured to assign a data access location to each data element from the set of data elements.

At step 304, the processor 201 may be configured to generate an encrypted data access location by processing each data element corresponding to each role from the set of roles based on a public key corresponding to each role from the set of roles respectively.

At step 305, the processor 201 may be configured to generate a set of machine-scannable codes corresponding to each of the encrypted data access locations.

At step 306, the processor 201 may be configured to print the set of machine-scannable codes over the physical mail package. Furthermore, during operation a user device 103 corresponding to a target role is configured to capture the private-key from the public-private key pair associated with the target role. The user device 103 is configured to scan a target machine-scannable code corresponding to the target role and decrypt the encrypted target data access location to obtain the at least one data element corresponding to the target role.

Figure 4:
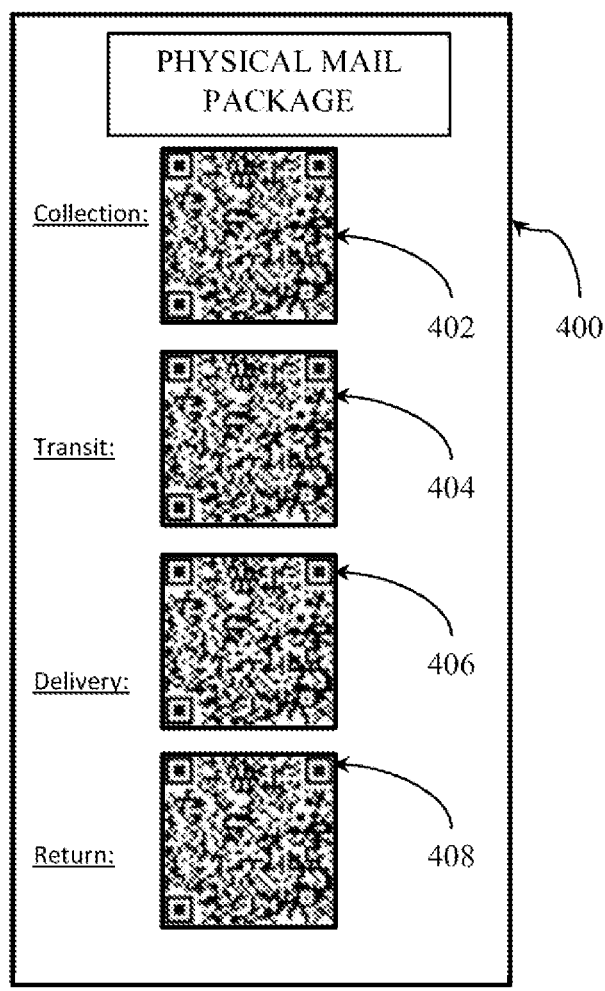
FIG. 4 illustrates a label 400 to be affixed on the physical mail package, in accordance with an embodiment of the present disclosure.

Referring now to FIG. 4 a label 400 to be affixed on the physical mail package is illustrated. The machine-scannable codes in the form of QR codes (402-408) are printed on the label 400. In place of QR codes (402-408), barcodes or any other two-dimensional or three-dimensional machine-scannable codes may be printed on the label 400. The label 400 may be generated by accessing the system 101 as discussed with respect to FIGS. 1 and 2. This label 400 may then be affixed on the physical mail package. As represented in FIG. 4, there are multiple QR codes (402-408) printed on the label 400. Each QR code may correspond to a different role associated with the package delivery process. For example, the collection QR code 402 may be scanned by a mail package collection personnel appointed by the package delivery service provider. The collection QR code 402 may be scanned by the mail package collection personnel using the application 102. The application 102 may use the private-key of the mail package collection personnel to fetch the URL corresponding to the mail collection information in respect of the physical mail package. It must be noted that if the mail package collection personnel scans the other QR codes (404-408) printed on the label 400, the mail package collection personnel will not be able to decrypt the other QR codes (404-408) and fetch the URLs associated with them. This is because the URLs corresponding to the other QR codes (404-408) are encrypted using different public keys. In a similar manner as the physical mail package reaches different transit points, different stakeholders may scan the appropriate QR codes corresponding to their respective roles and decrypt the corresponding information.

Although implementations of the system 101 and the method 300 for concealing information associated with a physical mail package have been described in language specific to structural features and methods, it must be understood that the claims are not limited to the specific features or methods described. Rather, the specific features and methods are disclosed as examples of implementations for the system 101 and the method 300 for concealing information associated with a physical mail package.

The invention claimed is:

1. A system for concealing information associated with a physical mail package, the system comprising:
   a memory; and
   a processor coupled to the memory, wherein the processor is configured to execute programmed instructions stored in the memory to:
      maintaining a standardized schema, wherein the standardized schema defines a set of roles, wherein a public-private key pair is generated corresponding to each role from the set of roles;
      receiving a dataset, corresponding to a physical mail package, from a client application, wherein the dataset comprises information corresponding to a set of data elements, wherein at least one data element, from the set of data elements, corresponds to a role from the set of roles, wherein the set of roles comprises a sender role, a carrier role, and a receiver role;
      assigning a data access location to each data element from the set of data elements, wherein the data access location is a Uniform Resource Locator (URL), wherein the URL maintains information corresponding to at least one of a sender, a receiver, and a carrier;
      generating an encrypted data access location by processing each data element corresponding to each role from the set of roles based on a public key corresponding to each role from the set of roles respectively;
      generating a set of machine-scannable codes corresponding to each of the encrypted data access locations; and
      printing the set of machine-scannable codes over the physical mail package, wherein the private-key from the public-private key pair associated with a target role is stored on a user device, and wherein the user device is configured to scan a target machine-scannable code corresponding to the target role, and decrypt an encrypted target data access location to obtain the at least one data element corresponding to the target role.

2. The system as claimed in claim 1 is further configured for
   selecting a sender's geographical location from the dataset in respect of the physical mail packet;
   determining the geo-coordinates of the sender's geographical location;
   generating a first URL pointing to the geo-coordinates of the sender's address, wherein the first URL is associated with the sender role;
   selecting the receiver's geographical location from the dataset in respect of the physical mail packet;
   determining the geo-coordinates of the receiver's geographical location; and
   generating a second URL pointing to the geo-coordinates of the receiver's address, wherein the second URL is associated with the receiver role.

3. The system as claimed in claim 2, wherein each machine-scannable code, from the set of machine-scannable codes, is generated by
   hashing the first URL pointing to the data element in respect of the physical mail packet; and
   generating a QR code representing the hash.

4. The system as claimed in claim 1, wherein the client application is a mobile application installed on a user device.

5. The system as claimed in claim 1, wherein each participant in a physical mail packet journey is assigned a separate role, and wherein a public-private key pair for each role is generated, and wherein the public-key is stored in the dataset and the private-key is stored on a device of a user who is assigned the role corresponding to the public-private key pair.

6. The system as claimed in claim 1, wherein a machine-scannable code, from the set of machine-scannable codes, is a QR code.

7. A method for concealing information associated with a physical mail package, the method comprising steps of:
   maintaining, by a processor, a standardized schema, wherein the standardized schema defines a set of roles, wherein a public-private key pair is generated corresponding to each role from the set of roles;
   receiving, by the processor, a dataset, corresponding to a physical mail package, from a client application, wherein the dataset comprises information corresponding to a set of data elements, wherein at least one data element, from the set of data elements, corresponds to a role from the set of roles, wherein the set of roles comprises a sender role, a carrier role, and a receiver role;
   assigning, by the processor, a data access location to each data element from the set of data elements, wherein the data access location is a Uniform Resource Locator (URL), wherein the URL maintains information corresponding to at least one of a sender, a receiver, and a carrier;

generating, by the processor, an encrypted data access location by processing each data element corresponding to each role from the set of roles based on a public key corresponding to each role from the set of roles respectively;

generating, by the processor, a set of machine-scannable codes corresponding to each of the encrypted data access locations; and printing, by the processor, the set of machine-scannable codes over the physical mail package, wherein the private-key from the public-private key pair associated with a target role is stored on a user device, and wherein the user device is configured to scan a target machine-scannable code corresponding to the target role and decrypt an encrypted target data access location to obtain the at least one data element corresponding to the target role.

8. The method as claimed in claim 7, is further configured for
selecting, by the processor, a sender's geographical location from the dataset in respect of the physical mail packet;
determining, by the processor, the geo-coordinates of the sender's geographical location;
generating, by the processor, a first URL pointing to the geo-coordinates of the sender's address, wherein the first URL is associated with the sender role;
selecting, by the processor, the receiver's geographical location from the dataset in respect of the physical mail packet;
determining, by the processor, the geo-coordinates of the receiver's geographical location; and
generating, by the processor, a second URL pointing to the geo-coordinates of the receiver's address, wherein the second URL is associated with the receiver role.

9. The method as claimed in claim 8, wherein each machine-scannable code from the set of machine-scannable codes, is generated by
hashing the first URL pointing to the data element in respect of the physical mail packet; and
generating a QR code representing the hash.

10. The method as claimed in claim 7, wherein a machine-scannable code, from the set of machine-scannable codes, is a QR code.

11. The method as claimed in claim 7, wherein the client application is a mobile application installed on a user device.

12. The method as claimed in claim 7, wherein each participant in a physical mail packet journey is assigned a separate role, and wherein a public-private key pair for each role is generated, and wherein the public-key is stored in the dataset and the private-key is stored on a device of a user who is assigned the role corresponding to the public-private key pair.

* * * * *